United States Patent [19]
Barrera

[11] 3,747,768
[45] July 24, 1973

[54] FILTER UNIT AND FILTRATE COLLECTOR THEREFOR

[75] Inventor: Salvatore E. Barrera, Berwick, Pa.

[73] Assignee: Wilkes Pool Corporation, Berwick, Pa.

[22] Filed: May 9, 1972

[21] Appl. No.: 251,760

[52] U.S. Cl.............................. 210/288, 210/289
[51] Int. Cl............................................. B01d 29/08
[58] Field of Search............ 138/177, 178, DIG. 11; 210/169, 288, 289, 291, 440, 443; 285/150, 184, 261, 263; 287/87

[56] References Cited
UNITED STATES PATENTS

| | | | |
|---|---|---|---|
| 1,714,563 | 5/1929 | Kiel.................................. | 285/263 |
| 3,009,577 | 11/1961 | Gugeler............................ | 210/289 |
| 3,011,643 | 12/1961 | McCoy............................. | 210/169 |
| 3,625,365 | 12/1971 | Armstrong et al............. | 210/288 X |

Primary Examiner—Samih N. Zaharna
Assistant Examiner—Ivars Cintins
Attorney—Thomas B. Van Poole, Peter N. Lalos et al.

[57] ABSTRACT

A filter unit generally including a tank having a restricted opening into which a fluid distributor may be fitted, a return conduit disposed within the fluid tank and connected to the distributor, at least one filtrate collector disposed in the tank, including a housing defining a fluid chamber communicating with the return conduit and a plurality of filtrate collector conduits operatively connected to the housing for pivotal movement in planes including a longitudinal center line of the housing whereby the collector units may be moved together to positions adjacent the housing center line to permit the insertion or removal of the filtrate collector through the restricted opening of the tank and spread apart to positions disposed substantially radially relative to the housing center line, within the tank, and a filter medium disposed in the fluid tank embedding the collector conduits.

16 Claims, 8 Drawing Figures

FILTER UNIT AND FILTRATE COLLECTOR THEREFOR

This invention relates to a filter unit and more particularly to a novel unit for filtering liquids such as water used in swimming pools. The invention further contemplates a novel filtrate collector for a filter unit, particularly adapted for use in filter units utilizing sand as a filter medium.

In most conventional units used for filtering liquids, there usually is provided a fluid tank having a restricted opening, a fluid valve mounted in the opening, a return line disposed within the fluid tank and connected to the valve in the opening, and a filter element or medium through which the liquid to be filtered is passed during the filtering operation. In applications where a filter medium such as sand is used, it has been a common practice to provide an elongated return conduit in the fluid tank provided with a plurality rigidly secured, radially projecting conduits having filtrate receiving openings, which are embedded in the sand and function to receive filtrate through the openings and conduct such filtrate to the return conduit from where it is conducted to the fluid valve in the opening of the tank.

In the fabrication of such types of units, due to the construction of the filtrate collectors and the restricted access openings of the tanks, it has been necessary to secure the filtrate collectors to the return conduit of the filter, within the filter tank. Such procedure has been found to be undesirable in that it is cumbersome and time consuming.

Accordingly, it is the principal object of the present invention to provide an improved filter unit.

Another object of the present invention is to provide a novel unit for filtering liquids.

A further object of the present invention is to provide a novel filter unit utilizing sand as a filter medium.

A still further object of the present invention is to provide an improved filter unit having a novel filtrate collector.

Another object of the present invention is to provide an improved filter unit which is provided with a preassembled filtrate collector that can be readily inserted into and removed from the fluid tank thereof.

A further object of the present invention is to provide an improved filter unit utilizing sand as a filter medium disposed within a fluid tank provided with a restricted access opening, having a novel filtrate collector adapted to be embedded in the sand medium and readily insertable and removable through the restricted access opening.

Another object of the present invention is to provide a novel filtrate collector for a filter unit.

A further object of the present invention is to provide a novel filtrate collector for a filter unit, which may be preassembled for mounting in the tank of the filter unit.

A still further object of the present invention is to provide a novel filtrate collector suitable for use in a filter unit provided with a fluid tank having a restricted access opening, which may be readily inserted and removed through such restricted access opening.

Another object of the present invention is to provide a novel filtrate collector adapted to be embedded in a filter medium disposed in the tank of a filter unit.

A further object of the present invention is to provide a novel filtrate collector adapted to be embedded in a filter medium of sand deposited in the tank of a filter unit.

A still further object of the present invention is to provide a novel filter unit and a novel filtrate collector for a filter unit, each of which are comparatively simple in construction, relatively inexpensive to manufacture and highly effective in performance.

Another object of the invention is to provide a novel method of making a filtrate collector.

Other objects and advantages of the present invention will become more apparent to those persons having ordinary skill in the art to which the invention pertains, from the following description taken in conjunction with the accompanying drawings wherein.

Figure 1:
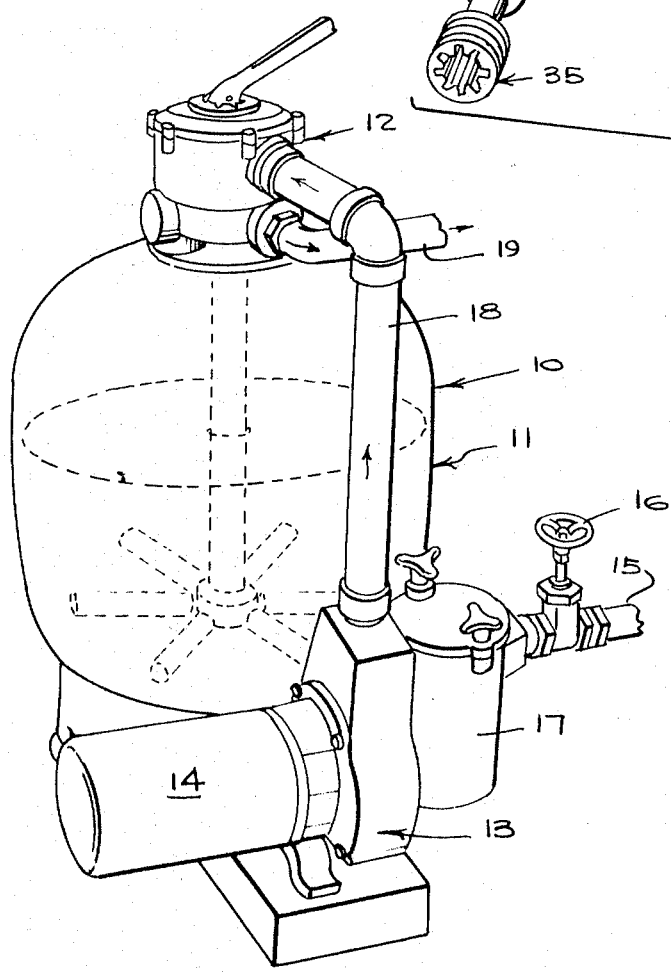
FIG. 1 is a perspective view of an embodiment of the invention.
Figure 7:
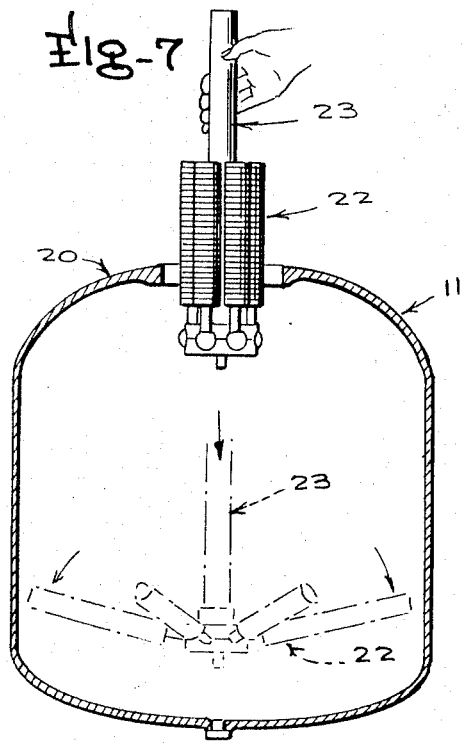
Figure 8:
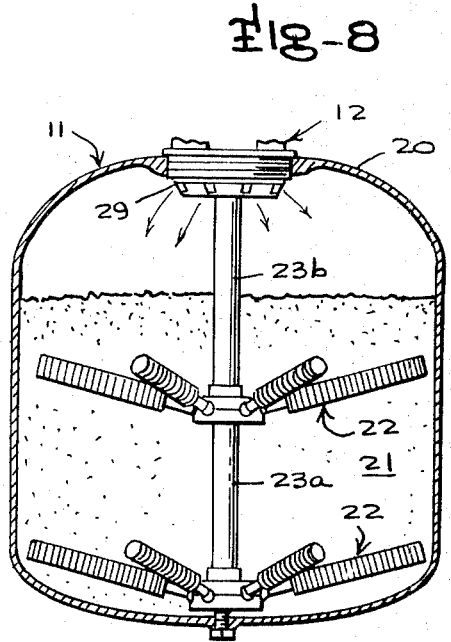

FIG. 7 is a vertical cross-sectional view of the embodiment shown in FIG. 1, illustrating the manner in which the filtrate collector may be collapsed so that it may be inserted or removed through the restricted access opening of the tank thereof; and FIG. 8 is a vertical cross-sectional view of another embodiment of the invention utilizing a number of filtrate collectors embedded in the filter medium disposed within the tank thereof.

Briefly described, the present invention relates to a filter unit generally including a fluid tank having a restricted opening in the upper end thereof in which a fluid distributor provided with at least two fluid ports may be fitted, a return conduit disposed within the fluid tank, communicating at an upper end thereof with a port of the fluid distributor, a filter medium disposed in the fluid tank, and at least one filtrate collector disposed within the tank embedded in the filter medium and communicable with the return conduit. The collector filtrate includes a housing defining a fluid chamber communicating with the return conduit, and a plurality of filtrate collector conduits operatively connected to the housing for pivotal movement in planes including a longitudinal center line of the housing whereby the collector conduits may be moved together to positions adjacent the housing center line to permit the insertion or removal of the filtrate collector through the restricted opening in the tank, and spread apart to positions disposed substantially radially relative to the housing center line within the tank. Each of the collector conduits is provided with a longitudinally disposed fluid passageway communicable with the fluid chamber of the collector housing when the collector conduits are disposed in their spread-apart positions, and a plurality of filtrate receiving openings intercommunicating the exterior thereof with the longitudinal passageway in the conduit.

Figure 3:
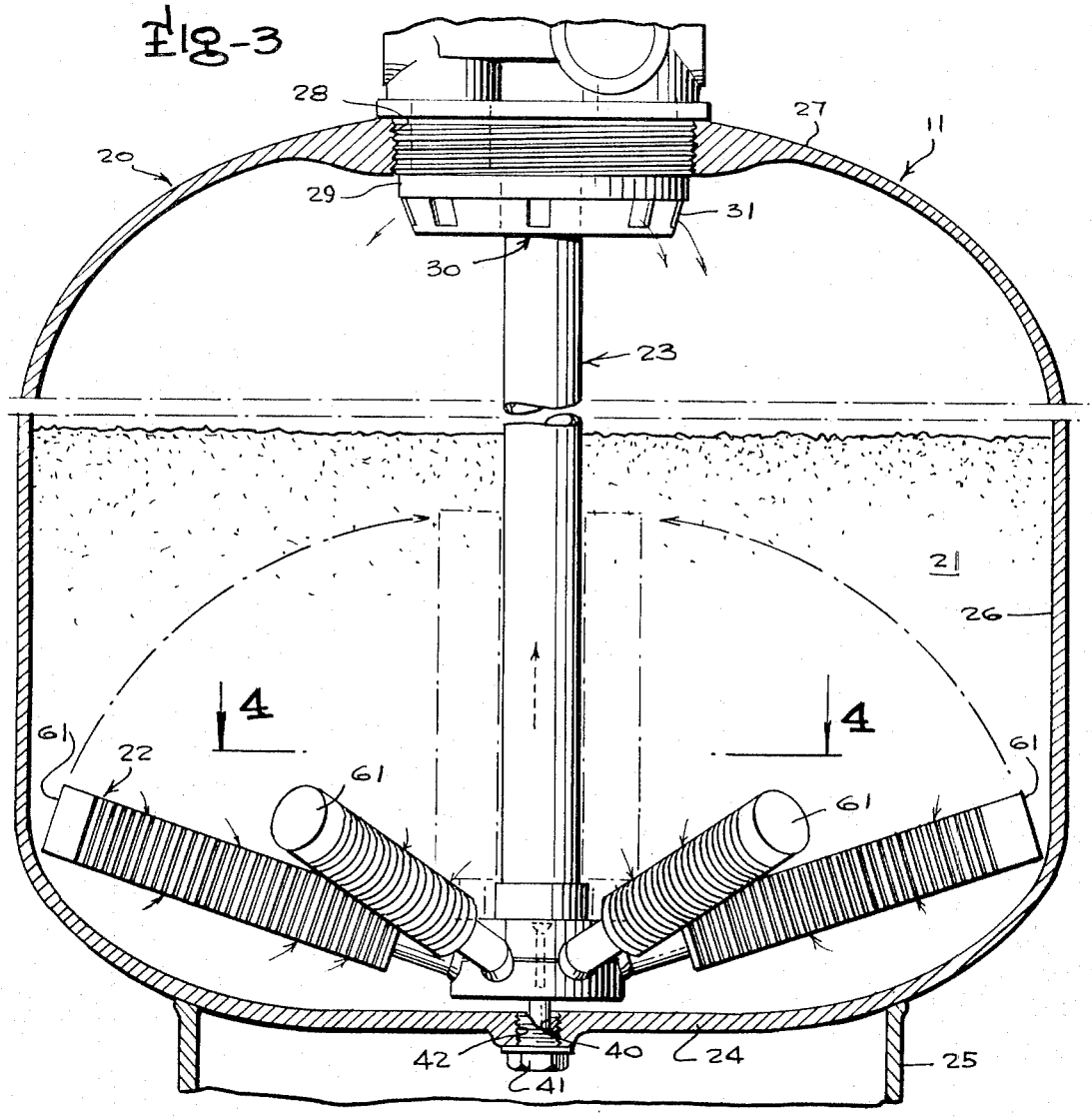
FIG. 3 is an enlarged, vertical cross-sectional view of the embodiment illustrated in FIG. 1, having portions thereof broken away.
Figure 4:
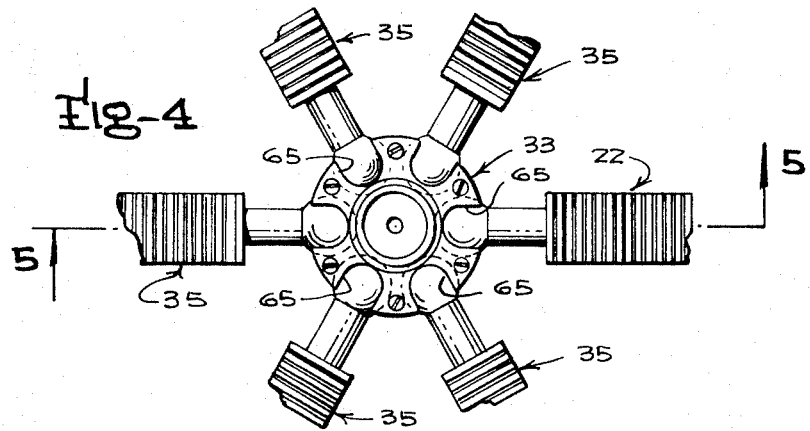
FIG. 4 is a cross-sectional view taken along line 4—4 in FIG. 3.

Referring to FIG. 1, there is illustrated a filter system 10 consisting of a filter unit 11 a selector valve 12 mounted on the filter unit, a pump 13 driven by a motor 14, an inlet line 15 interconnecting the body of liquid to be filtered and the inlet side of the pump 13 and provided with a cutoff valve 16 and chlorinator 17, a fluid line 18 interconnecting the pump 13 and the selector valve 12 and a fluid outlet line 19 interconnecting the selector valve 12 and the body of liquid being filtered. As best illustrated in FIG. 3, the filter unit 11 consists of a tank 20, a filter medium 21 disposed in the tank, a filtrate collector 22 disposed within the tank and embedded in the filter medium, and a return conduit 23 disposed within the tank, having the lower portion thereof embedded in the filtrate medium and the lower end thereof communicating with the filtrate collector 22.

The filter tank 20 generally consists of a bottom wall section 24 having an upwardly curved peripheral portion, seated on an annular base member 25, a substantially cylindrical side wall section 26, and an upper wall section 27 having a downwardly curved peripheral portion and an axially disposed restricted access opening 28 which is threaded. As best illustrated in FIG. 3, the selector valve 12 is mounted on the filter unit 11 by means of an adapter 29 which is threaded into the restricted access opening 28. The construction and operation of the selector valve 12 and adapter 29 are described in my co-pending U.S. Pat. application, Ser. No. 220,834, filed Jan. 26, 1972. As indicated in such description, the adapter 29 is provided with an axially disposed opening 30 and a plurality of circumferentially spaced ports 31 which communicate with the interior of the tank 20.

Within the tank 20, the return conduit 23 is mounted axially, communicates at its upper end with the opening 30 of adapter 29 and terminates at its lower end above the lower wall section 24 of the tank. As shown in FIG. 3, the lower portion of conduit 23 is embedded in the filtering medium 21. Also embedded in the medium and disposed between the lower end of the return conduit 23 and the bottom wall section 24 of the tank is the filtrate collector 22. As best seen in FIGS. 2 through 5, the filtrate collector consists of a center housing 33 defining a fluid chamber 34, and a plurality of filtrate collector conduits 35. The housing 33 includes a lower housing section 36 adapted to be seated on the bottom wall section 24 of the tank and an upper housing section 37 adapted to be connected to the lower end of the return conduit.

Figure 2:
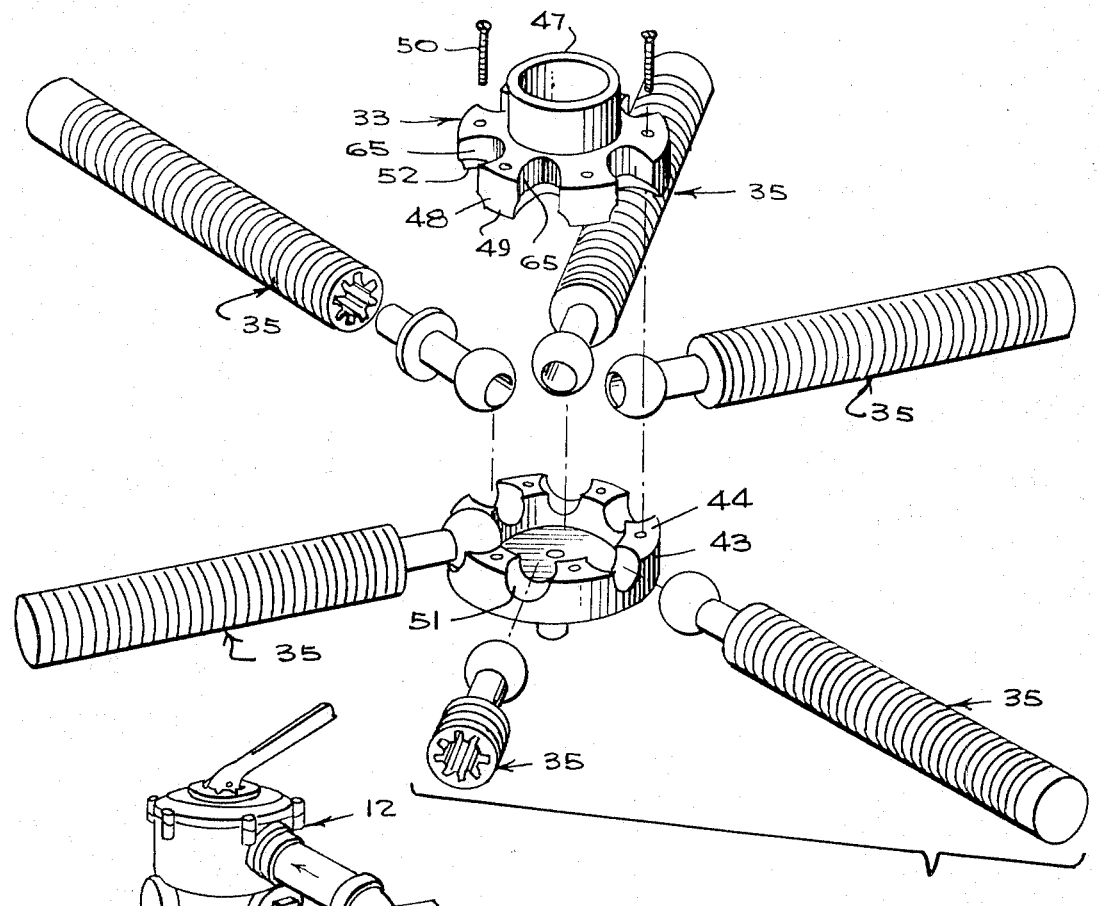
FIG. 2 is a perspective view of a filtrate collector utilized in the embodiment shown in FIG. 1, illustrating the components thereof in exploded relation.

The lower housing section 36 consists of a circular bottom wall portion 38 provided with an opening 38a communicating with a depending conduit portion 39. The conduit portion 39 is adapted to be seated in a recess 40 provided in a plug 41 threaded into an axially disposed opening 42 in the bottom wall section 24 of the tank. The section 36 further consists of an upwardly projecting annular flange portion 43 defining the lower portion of fluid chamber 34, providing an annular seating surface 44 as best illustrated in FIG. 2. The upper housing section 37 is provided with an upper circular wall portion 45 having an opening 46, an upwardly projecting, annular flange portion 47 adapted to receive the lower end of the return conduit 23 to communicate the fluid chamber 34 with the return conduit through the opening 46, and a depending, annular flange portion 48 defining the upper portion of fluid chamber 34 when the lower annular surface 49 thereof is seated on the annular surface 44 of lower housing section 36 and the housing sections are secured together by means of a plurality of circumferentially spaced screws 50.

Figure 5:
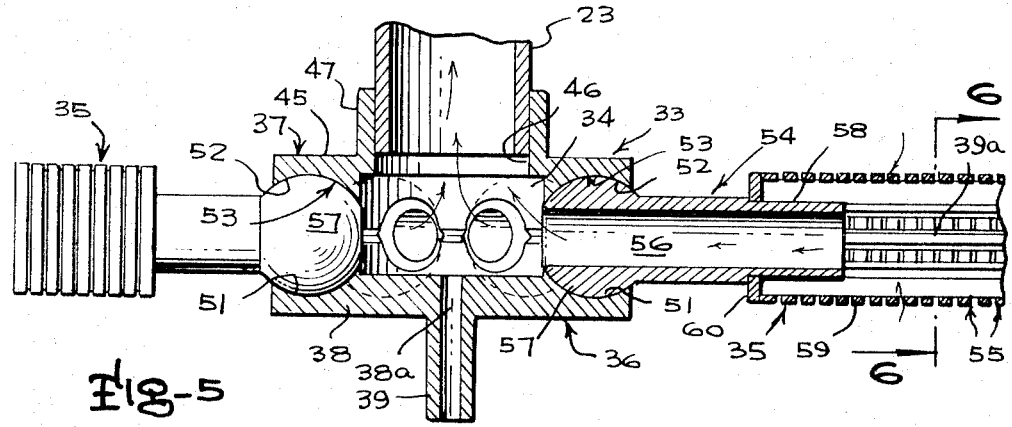
FIG. 5 is an enlarged cross-sectional view taken along line 5—5 in FIG. 4.

As best seen in FIGS. 2 and 5, the annular surface 44 of lower housing section 36 is provided with a plurality of circumferentially spaced recesses 51 which extend radially and through the annular flange portion 43, and the annular surface 49 of upper housing section 37 is provided with a plurality of circumferentially spaced, complementary recesses 52 which also are radially disposed and extend through the flange portion 48, and are adapted to register with the recesses 51 when the housing sections are joined together to provide the housing 33 defining the fluid chamber 34. The recesses 51 and 52 have spherical configurations so that when the housing sections 36 and 37 are joined together to form the housing 33, the housing will be provided with a plurality of circumferentially spaced spherical sockets 53 intercommunicating the fluid chamber 34 with the exterior of the housing 33.

Figure 6:
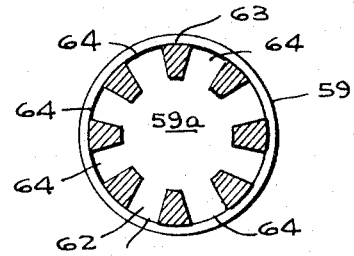
FIG. 6 is an enlarged cross-sectional view taken along line 6—6 in FIG. 5.

Referring to FIGS. 2, 5 and 6, each of the filtrate collector conduits 35 consists of a base connecting member 54 and a perforated member 55. The base connecting member 54 has a tubular configuration providing an elongated passageway 56. It further is provided with an inner, spherically configured end portion 57 seated in a spherical socket 53 in housing 33 to provide a ball and socket connection between the filtrate collector and the center housing, with the passageway 56 adapted to communicate with the fluid chamber 34, and a reduced, outer end portion 58 which is received within an inner end of the perforated member 55. The perforated member 55 includes an elongated cylindrical section 59 defining a longitudinally disposed fluid passageway 59a, an inner wall 60 provided with an opening for receiving the reduced outer end portion 58 of the base connecting member 54 therethrough to intercommunicate the fluid passageways 56 and 59a, and an outer end wall section 61. The cylindrical section 59 is internally splined as shown in FIG. 6 to provide a plurality of longitudinally disposed, circumferentially spaced internal splines or grooves 62, and further is provided with a plurality of longitudinally spaced, circumferentially disposed grooves 62 in the cylindrical outer surface thereof, each having a depth sufficient to communicate such circumferentially disposed grooves with the longitudinally disposed grooves 62 to provide a plurality of longitudinally spaced sets of circumferentially spaced openings 64 intercommunicating the longitudinally disposed fluid passageway 59a of the filtrate collector and the exterior thereof. It is contemplated that the filtrate receiving openings 64 of the filtrate collector be provided with a size smaller than the grain size of the filter medium in which the filtrate collector will be embedded during normal operating conditions. It will be appreciated that the size of such openings can be determined by the widths of longitudinal grooves 62 or circumferential grooves 63.

It is contemplated that the perforated members 55 of the filtrate collector conduits shall be constructed from any suitable material which is incapable of physically or chemically reacting with the liquid to be filtered or any of the materials contained within such liquid. It further is contemplated that such perforated members will be fabricated by utilizing tubular stock of a suitable material such as a plastic, forming the internal splines 62 and then forming the cylindrical grooves 63 to a depth sufficient to communicate the grooves 63 with the grooves 62. The size of the openings can be fixed by selecting appropriate widths for one or both of the grooves 62 and 63. The splines 62 can be formed either by an extrusion process or by taking tubular stock and machining the splines into it, and the recesses 63 can be formed by any conventional cutting method.

In assembling the filtrate collector 22, the filtrate collector conduits 35 are first preassembled by press fitting the base connecting members 54 into the openings provided in the inner end wall sections 60 of the perforated members 55. The filtrate collector conduits 36 are then connected to the housing 33 by seating the spherical end portions 57 of the conduits 35 in the spherically configured recesses 51 of lower housing sections 36, positioning the upper housing section 37 on the lower housing section 36 so that the surface 49 is seated on the surface 44, and the spherically configured recesses 52 are seated on the spherically configured portions 57, and then securing the housing sections together by means of the screws 50. The filtrate collector conduits 35 will then be disposed substantially radially relative to the axial center line of the housing 33, and be connected thereto by means of ball and socket connections, with their aligned passageways 56 and 59a communicating with the filter chamber 34.

When it is desired to assemble the filter unit 11, the return conduit 23 is fitted into the annular flange portion 47 of housing 33, the filtrate collector conduits 35 are pivoted upwardly and inwardly toward the return conduit, and the entire assembly is inserted through the threaded opening 28 of the tank, as illustrated in FIG. 7. In this regard, it is to be noted that the cylindrical outer wall of the upper housing section 37 is provided with a plurality of circumferentially spaced recesses 65 which are adapted to receive the intermediate portions of base connecting members 54 of the filtrate collector conduits, and thus permit the filtrate collector to be collapsed similar to an umbrella. After the filtrate collector has been inserted through the opening 28 in the tank, the center housing thereof is positioned within the tank by seating the conduit portion 39 thereof in the recess 40 provided in the threaded plug 41. The assembler may then reach through the opening 28 and spread the conduits 35 apart into positions as illustrated in FIG. 3. The filter medium, usually sand, is then poured into the tank through access opening 28 so that the filtrate collector and lower portion of the return conduit become embedded in the medium with the return conduit disposed axially, and a certain amount of head space is provided in the tank. The valve 12 with the adapter 29 depending therefrom is then fitted on the tank by threading the adapter into the access opening 28 so that the axially disposed opening in the adapter communicates with the upper end of the return conduit and the circumferentially spaced ports 31 communicate with the head space above the filter medium in the tank. The filter system then can be completed by securing the fluid line 18 to the valve 12, interconnecting the inlet line 15 with the body of fluid to be filtered and interconnecting the discharge line 19 with the selector valve 12 and the body of fluid.

In the operation of the filter system 10 to filter a liquid, when the valve 16 is opened, the pump 13 is operating and the selector valve 12 is adjusted to its filter setting, liquid drawn from a body of liquid to be filtered such as a swimming pool will be pumped through fluid line 18, selector valve 12, ports 31 of adapter 29, and the filter medium 21 where the filtering action occurs. The filtrate will then flow through filtrate receiving openings 64 and passageways 59a and 56 of the filtrate collector conduits 35, fluid chamber 34 in housing 33, return conduit 23, selector valve 12 and then discharge line 19 to the body of liquid. Whenever it is desired to backflush the filter unit, the selector valve 12 is reset to its proper position so that the flow of liquid through the filter unit is reversed. Under such conditions, liquid under pressure will flow through opening 30 of the adapter, return conduit 23, fluid chamber 34 of housing 33, aligned passageways 56 and 59a, and openings 64 in the filtrate collector conduits 35, upwardly through the filter medium 21 and then through ports 31 in the adapter to be discharged through the selector valve 12. The various positions of the selector valve 12 to provide the different directions of flow of liquid through the filter unit 11 and selector valve 12 are described in detail in my co-pending U.S. Pat. application, Ser. No. 220,834, as aforementioned.

To disassemble the filter unit 11 for maintenance purposes or perhaps to replace the filtrate collector 22, the selector valve 12 with the adapter 29 is first removed from the tank. The filter medium 21 is then removed until the filtrate collector is freed and can be lifted out of the tank. To permit the filtrate collector to pass through the access opening 28, the filtrate collector conduits 35 are pivoted inwardly against the return conduit, and then lifted upwardly and removed through the opening 28. It is to be noted that the tank 20 may be drained simply by removing the threaded plug 41 from the bottom wall section 24.

Referring to FIG. 8, there is illustrated another embodiment of the invention. This embodiment is similar to the embodiment illustrated in FIGS. 1 through 7 with the exception that a plurality of filtrate collectors 22 are utilized which are interconnected by one or more return conduit sections 23a and are connected to the adapter 29 by means of a return conduit section 23b. It will be appreciated that the center housing 33 interposed between a pair of return conduit sections will be modified slightly by providing an opening in the lower wall thereof which communicates with a return conduit section. The number of filtrate collectors 22 utilized in a filter unit will depend upon the size and capacity of a unit. It will be seen, however, that the use of a number of filtrate collectors 22 will function to increase the capacity of a filter unit.

Although any suitable type of filter medium may be utilized in the filter unit 11, it is contemplated that any conventional high rate filter sand can be used. Regardless of the type of filter medium used, it further is contemplated that the filtrate receiving openings 64 of the filtrate collector conduits 35 will be of a size smaller than the grains of the filter medium.

From the foregoing detailed description, it will be evident that there are a number of changes, adaptations and modifications of the present invention which come within the province of those persons skilled in the art. However, it is intended that all such variations not departing from the spirit of the inventin be considered as within the scope thereof as limited solely by the appendant claims.

I claim:

1. A filter unit comprising a fluid tank having a restricted opening in an upper end thereof into which a fluid distributor provided with at least two fluid ports may be fitted, a return conduit disposed within said fluid tank, said return conduit communicating at an upper end thereof with a port of said fluid distributor, at least one filtrate collector disposed in said tank, said filtrate collector including a housing defining a fluid chamber communicating with the interior of said return conduit, and a plurality of filtrate collector conduits operatively connected to said housing for pivotal movement in planes including a longitudinal center line of said housing whereby said collector conduits may be moved together to positions adjacent said center line to permit the insertion or removal of said filtrate collector through the restricted opening of said tank, and spread apart to positions disposed substantially radially relative to said center line within said tank, each of said collector conduits having a longitudinally disposed fluid passageway communicable with the fluid chamber of said collector housing when said collector conduits are disposed in their spread-apart positions, and a plurality of filtrate receiving openings intercommunicating the exterior thereof with said longitudinal passageway, and a filter medium disposed in said fluid tank embedding said collector conduits.

2. A filter unit according to claim 1 wherein said filtrate collector conduits are pivotally connected to said housing with ball and joint connections.

3. A filter unit according to claim 1 wherein said filtrate receiving openings comprise a plurality of longitudinally spaced sets of circumferentially spaced openings.

4. A filter unit according to claim 1 wherein each of said filtrate collector conduits includes a section provided with an internally splined configuration and a plurality of longitudinally spaced, circumferentially disposed grooves communicating with the longitudinal grooves of said internal splines to provide said filtrate receiving openings.

5. A filter unit according to claim 1 wherein said filter medium consists of sand and the size of said filtrate receiving openings is smaller than the grain size of the sand.

6. A filter unit according to claim 1 wherein the housing of one filtrate collector includes means for seating the filtrate collector on a bottom wall of said fluid tank.

7. A filter unit according to claim 1 including a plurality of filtrate collectors interconnected by segments of said return conduit.

8. A filter unit according to claim 1 wherein said filtrate collector housing comprises a lower section including a circular bottom wall portion and an upwardly projecting annular flange portion defining a lower portion of said housing chamber, an upper section including a circular upper wall portion and a depending annular flange seated on the annular flange portion of said lower section and defining an upper portion of said housing chamber, and means for securing said housing sections together, at least one of the circular wall portions of said housing sections having an opening intercommunicating said housing chamber and said return conduit, the annular flange portions of said housing sections having a plurality of openings intercommunicating the exterior thereof and the fluid chamber of said housing, having a spherical configuration, the outer wall of said upper housing section having a plurality of circumferentially spaced, longitudinally disposed recesses aligned with said openings having spherical configurations, and said filtrate collector conduits having ball portions seated in said openings having spherical configurations to provide ball and socket connections between the collector conduits and said housing and adjacent longitudinally disposed sections receivable within the recesses in the wall of said upper housing section when said collector conduits are moved together by pivoting them into positions adjacent the longitudinal center line of said housing.

9. A filtrate collector for a filter unit including a filter tank having an opening into which a fluid distributor provided with at least two fluid ports may be fitted, and a return conduit disposed within said fluid tank communicating at an end thereof with a port of said fluid distributor, comprising the housing including a fluid chamber provided with at least one opening communicable with said return conduit, and a plurality of filtrate collector units operatively connected to said housing for pivotal movement in planes including a longitudinal center line of said housing whereby said collector units may be moved together to positions adjacent said center line to permit the insertion or removal of said filtrate collector through the opening of said tank, and spread apart to positions disposed substantially radially relative to the center line of said housing, each of said collector units having a longitudinally disposed fluid passageway communicable with the fluid chamber of said collector housing when said collector units are disposed in their spread-apart positions, and a plurality of filtrate receiving openings intercommunicating the exterior thereof and said longitudinal passageway.

10. A filtrate collector according to claim 9 wherein said filtrate collector conduits are pivotally connected to said housing with ball and joint connections.

11. A filtrate collector according to claim 9 wherein said filtrate receiving openings comprise a plurality of longitudinally spaced sets of circumferentially spaced openings.

12. A filtrate collector according to claim 9 wherein each of said filtrate collector conduits includes a section provided with an internally splined configuration and a plurality of longitudinally spaced, circumferentially disposed grooves communicating with the longitudinal grooves of said internal splines to provide said filtrate receiving openings.

13. A filtrate collector according to claim 9 wherein the size of said filtrate receiving openings is smaller than the size of sand used as a filter medium in said tank.

14. A filtrate collector according to claim 9 wherein the housing of said filtrate collector includes means for seating the filtrate collector on a bottom wall of said fluid tank.

15. A filtrate collector according to claim 9 wherein said housing includes a pair of openings communicable with segments of said return conduit.

16. A filtrate collector according to claim 9 wherein said housing comprises a lower section including a circular bottom wall portion and an upwardly projecting annular flange portion defining a lower portion of said housing chamber, an upper section including a circular upper wall portion and a depending annular flange seated on the annular flange portion of said lower section and defining an upper portion of said housing chamber, and means for securing said housing sections together, at least one of the circular wall portions of said housing sections having an opening for communicating the housing chamber with said return conduit, the annular flange portions of said housing sections having a plurality of openings intercommunicating the exterior thereof and the fluid chamber of the housing, having spherical configurations defining sockets, the outer wall of said upper housing section having a plurality of circumferentially spaced, longitudinally disposed recesses aligned with said openings having spherical configurations defining sockets, and said filtrate collector conduits having ball portions seated in said openings having spherical configurations defining sockets to provide ball and socket connections between the collector conduits and said housing and adjacent longitudinally disposed sections receivable within the recess in the wall of said upper housing section when said collector conduits are moved together by pivoting them into positions adjacent the longitudinal center line of said housing.

* * * * *